May 24, 1927.
C. W. CUSTER
INCLINOMETER
Filed Aug. 16, 1926
1,630,172
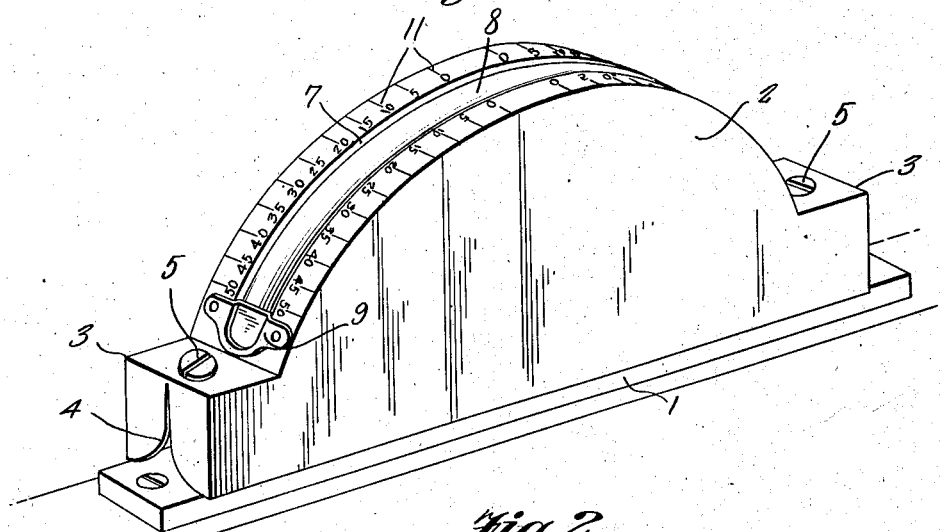
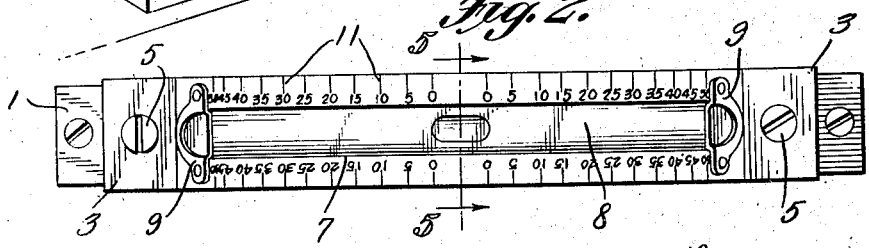
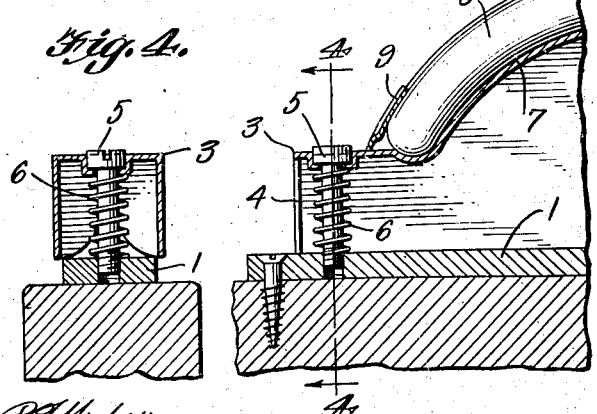
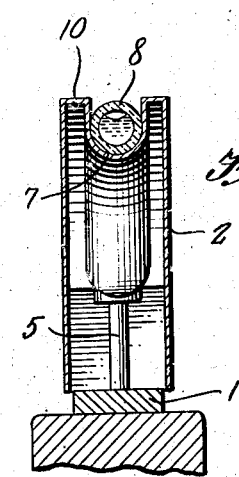
Charles W. Custer,
INVENTOR
BY Victor J. Evans
ATTORNEY
WITNESS:

Patented May 24, 1927.

1,630,172

UNITED STATES PATENT OFFICE.

CHARLES W. CUSTER, OF QUINTER, KANSAS.

INCLINOMETER.

Application filed August 16, 1926. Serial No. 129,524.

This invention relates to an inclinometer which is mainly designed for automobiles and aeroplanes, the general object of the invention being to provide means for indicating the incline in which the apparatus on which the device is placed is ascending or descending, the graduations being degrees of a circle.

Another object of the invention is to provide means for permitting the device to be adjusted so that it will normally register zero when the automobile or aeroplane is in a horizontal position.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings, wherein like characters denote like or corresponding parts throughout the several views, and in which:—

Figure 1 is a perspective view of the device.

Figure 2 is a plan view thereof.

Figure 3 is a longitudinal sectional view through one end of the device.

Figure 4 is a section on line 4—4 of Figure 3.

Figure 5 is a section on line 5—5 of Figure 2.

In these views, 1 indicates a base plate which is adapted to be fastened to a part of the apparatus on which the invention is to be used, said plate being of elongated shape, and 2 indicates the casing of the device which has its top part shaped in the arc of a circle, with its ends extended, as at 3. The bottom of the casing is open and said casing is of greater width than the base plate. One end of the casing is split, as at 4, with the outer walls of the split curving downwardly and outwardly, so that the curved walls engaging the upper corners of the base plate when pressure is applied to the casing will move the sides of the casing outwardly and thus permit the casing to be moved downwardly a slight extent upon the base. If desired, both ends of the casing may be split. The casing is held to the base by the screws 5 which pass through the ends 3 and a spring 6 surrounds the screw which holds the split end of the casing in position. Of course, if both ends are split, a spring would be placed on each screw. This spring tends to hold the casing in raised position. A groove 7 is formed in the arc-shaped part of the casing and extends longitudinally thereof and an arc-shaped bubble glass 8 is held in the said groove by the clips 9 at the ends thereof. The flat part 10 of the curved portion of the casing at each side of the groove is provided with the graduations 11 which indicate degrees of a circle. By providing the groove, the bubble glass is protected against injury.

From the foregoing, it will be seen that the device will indicate in degrees the grade at which an automobile is climbing or down which it is descending, and when used on an aeroplane, will indicate to the pilot whether he is descending or ascending and the degree of the inclination.

I prefer to make the bubble of such a length that it will cover ten degrees, as shown in the drawings. By making the casing adjustable on the base, the device can be set at zero after being placed in position.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a base plate, a casing having an arc-shaped upper edge, with extensions at its ends, one end being split, with the walls of the split curving outwardly to engage the corners of the plate, screws passing through the extensions and into the plate, a spring on the screw which passes through the split end extension for holding this end extension against the head of the screw, an arc-shaped bubble glass in the groove and the faces of the arc-shaped part at the sides of the groove being graduated with degrees of a circle.

In testimony whereof I affix my signature.

CHARLES W. CUSTER.